(12) United States Patent
Tokuyasu et al.

(10) Patent No.: US 7,000,380 B2
(45) Date of Patent: Feb. 21, 2006

(54) CONTROLLER OF CYLINDER INJECTION TYPE INTERNAL COMBUSTION ENGINE

(75) Inventors: Noboru Tokuyasu, Hitachinaka (JP); Toshiharu Nogi, Hitachinaka (JP); Takuya Shiraishi, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 53 days.

(21) Appl. No.: 10/476,972

(22) PCT Filed: May 9, 2001

(86) PCT No.: PCT/JP01/03871

§ 371 (c)(1),
(2), (4) Date: May 17, 2004

(87) PCT Pub. No.: WO02/090746

PCT Pub. Date: Nov. 14, 2002

(65) Prior Publication Data

US 2004/0194448 A1    Oct. 7, 2004

(51) Int. Cl.
*F01N 3/00* (2006.01)

(52) U.S. Cl. ............................ 60/285; 60/286; 60/278; 123/90.15; 123/568.11; 123/568.14; 123/295; 123/305

(58) Field of Classification Search ................... 60/278, 60/284, 285, 286; 123/90.15, 90.19, 295, 123/300, 305, 568.11, 568.14, 568.18, 568.19

See application file for complete search history.

(56) References Cited

U.S. PATENT DOCUMENTS

| | | | |
|---|---|---|---|
| 6,340,014 B1 * | 1/2002 | Tomita et al. | ............... 123/295 |
| 6,354,264 B1 * | 3/2002 | Iwakiri et al. | ............... 123/305 |
| 6,722,121 B1 * | 4/2004 | Gui et al. | ...................... 60/285 |
| 6,748,936 B1 * | 6/2004 | Kinomura et al. | ..... 123/568.22 |

FOREIGN PATENT DOCUMENTS

| | | | | |
|---|---|---|---|---|
| EP | 000 889 219 | 1/1999 | | |
| JP | 2-245460 | 10/1990 | | |
| JP | 6-323201 | 11/1994 | | |
| JP | 2000-154757 | * 6/2000 | .................. 60/278 |
| JP | 2000-257496 | 9/2000 | | |

* cited by examiner

*Primary Examiner*—Binh Q. Tran
(74) *Attorney, Agent, or Firm*—Crowell & Moring LLP

(57) ABSTRACT

The present invention is intended to provide a control system for an direct injection internal combustion engine capable of effectively reducing the amounts of both HC and NOx exhausted from a combustion chamber during a period from the start of the engine operation to the stop of the engine operation. It comprises an external EGR passage (11) for returning a part of exhaust gas from an exhaust pipe (10) to an intake pipe (5), an external EGR control valve (12) for controlling an amount of exhaust gas returned to the external EGR passage (11), and a valve timing varying mechanism (9A, 9B) for varying timing of opening and closing at least one of an intake valve and an exhaust valve. An ECU 100 controls the valve timing varying mechanism (9A, 9B) to always return internal EGR gas in an operation region where exhaust gas recirculation is required, and controls the external EGR control valve (12) to return exhaust gas in a combination of internal EGR and external EGR when an internal EGR rate provided by the valve timing varying mechanism (9A, 9B) is not sufficient to satisfy an EGR rate demanded depending on an operation state.

6 Claims, 13 Drawing Sheets

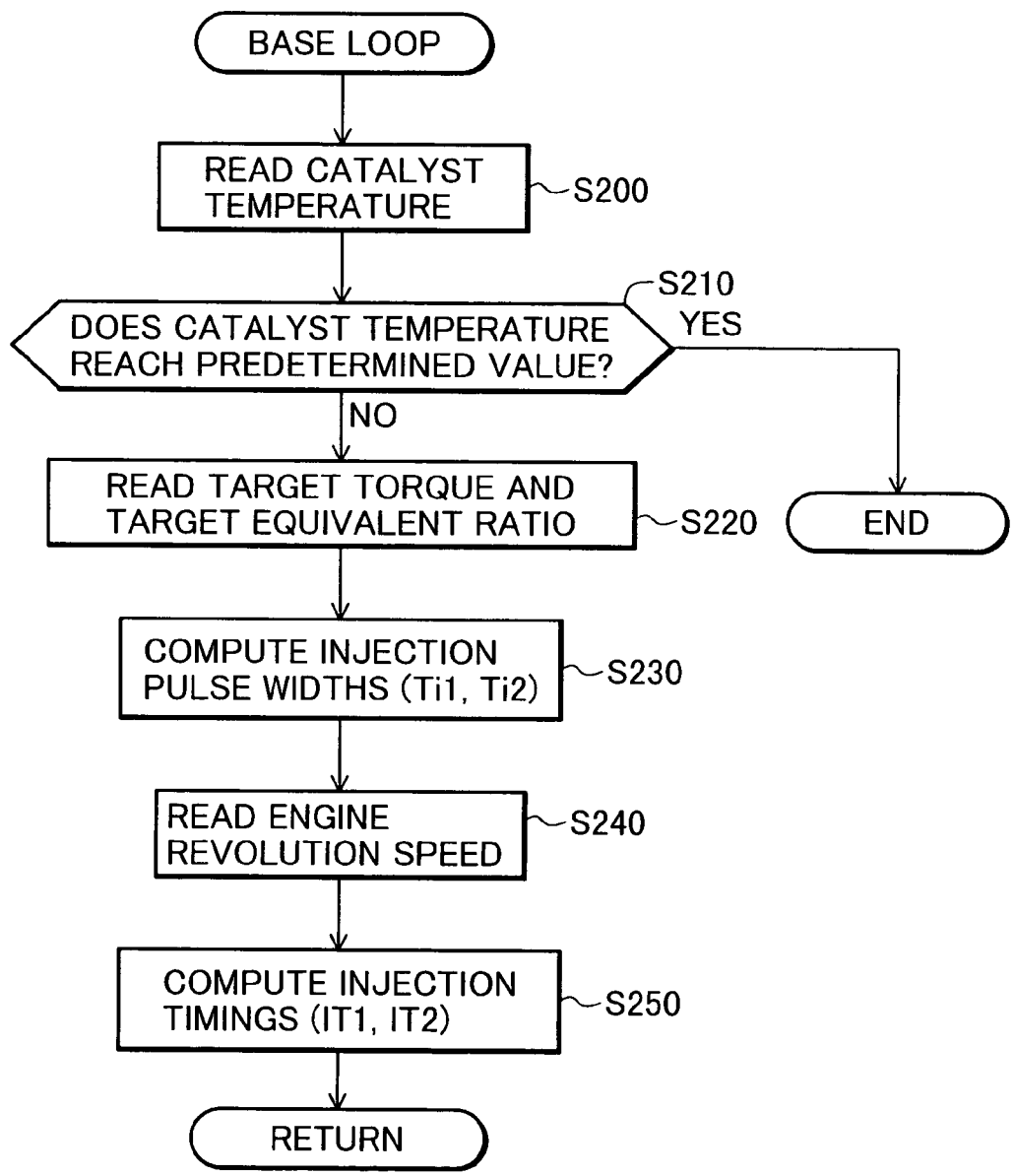

CONTROLLER OF CYLINDER INJECTION TYPE INTERNAL COMBUSTION ENGINE

TECHNICAL FIELD

The present invention relates to a control system for an direct injection internal combustion engine, and more particularly to a control system for an direct injection internal combustion engine suitable for use in control of the direct injection internal combustion engine equipped with an exhaust gas recirculation (EGR) device.

BACKGROUND ART

One known control system for an direct direct injection internal combustion engine equipped with an exhaust gas recirculation device is disclosed in, e.g., JP,A 2-245460. In the known control system, only internal EGR gas is returned to a combustion chamber in a low load range, and external EGR gas is returned to the combustion chamber in a high load range.

JP,A 6-323201, for example, discloses another control system for an internal combustion engine in which an air-fuel ratio is controlled so as to provide a larger air surplus rate in a low load range than in a high load range, the engine including a first EGR device for returning high-temperature exhaust gas to a combustion chamber and a second EGR device for returning low-temperature exhaust gas to it. In such an internal combustion engine, the high-temperature exhaust gas and the low-temperature exhaust gas are both returned to the combustion chamber in the low load range, and a total recirculation rate of the exhaust gas to the combustion chamber is reduced in the low load range as compared with that in the high load range.

By returning exhaust gas to the combustion chamber as disclosed in those known control systems, the maximum temperature in a cylinder is lowered and therefore the amount of NOx can be reduced. In particular, when external EGR gas, i.e., low-temperature exhaust gas, is returned to the combustion chamber, the resulting effect is more noticeable and the amount of NOx is reduced as the amount of external EGR gas increases.

Also, when internal EGR gas, i.e., high-temperature exhaust gas, is returned to the combustion chamber, the temperature in a cylinder is increased and therefore the effect of reducing the amount of NOx is lessened in this point. On the other hand, because atomization of a fuel spray is promoted or evaporation of fuel attached to wall surfaces of the combustion chamber is promoted, the amount of HC can also be reduced along with a reduction in the amount of NOx. Thus, recirculation of the internal EGR gas is effective in reducing the amounts of both HC and NOx.

DISCLOSURE OF THE INVENTION

However, when external EGR gas, i.e., low-temperature exhaust gas, is returned to the combustion chamber as disclosed in JP,A 2-245460 and JP,A 6-323201, the amount of HC tends to increase in spite of a reduction in the amount of NOx. Accordingly, if the EGR gas is returned in an excessive amount, a problem arises in that a large amount of HC is exhausted from the combustion chamber and combustion becomes instable.

Also, a large amount of internal EGR gas is required to effectively reduce the amount of NOx exhausted from the combustion chamber by using the internal EGR gas. However, if a variable valve is controlled to increase the amount of internal EGR gas, there arises a problem in instability of combustion or a lowering of engine torque. Further, if the engine undergoes stratified charge combustion in a cold state, another problem occurs in that injected fuel is attached to the wall surfaces of the combustion chamber and a large amount of HC is exhausted.

An object of the present invention is to provide a control device for an direct injection internal combustion engine, which can effectively reduce the amounts of HC and NOx exhausted from a combustion chamber during a period from the start of the engine operation to the stop of the engine operation.

To achieve the above object, according to the present invention, in an direct injection internal combustion engine of spark ignition type comprising an external EGR passage for returning a part of exhaust gas from an exhaust pipe to an intake pipe, an external EGR control valve for controlling an amount of exhaust gas returned to the external EGR passage, and a valve timing varying mechanism for varying timing of opening and closing at least one of an intake valve and an exhaust valve, control means is provided for controlling the valve timing varying mechanism to always return internal EGR gas in an operation region where exhaust gas recirculation is required, and for controlling the external EGR control valve to return exhaust gas in a combination of internal EGR and external EGR when an internal EGR rate provided by the valve timing varying mechanism is not sufficient to satisfy an EGR rate demanded depending on an operation state.

With the construction set forth above, the amounts of both HC and NOx exhausted from a combustion chamber during a period from the start of the engine operation to the stop of the engine operation can effectively be reduced.

BRIEF DESCRIPTION OF THE DRAWINGS

FIG. 19 is a flowchart showing control procedures of a fuel injection control method executed by the control system for the direct injection internal combustion engine according to the one embodiment of the present invention.

BEST MODE FOR CARRYING OUT THE INVENTION

The construction and operation of a control system for an direct injection internal combustion engine according to one embodiment of the present invention will be described below with reference to FIGS. 1 to 17.

The overall construction of the direct injection internal combustion engine according to this embodiment of the present invention will first be described with reference to FIG. 1.

Figure 1:
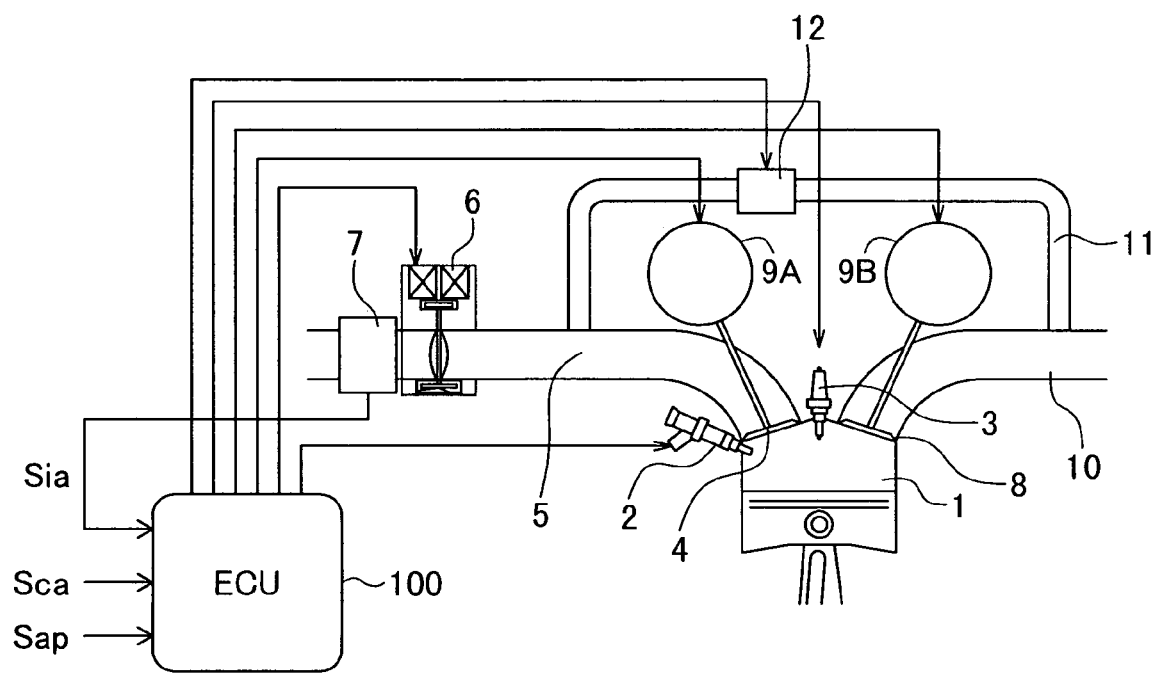
FIG. 1 is an overall schematic view of an direct injection internal combustion engine according to one embodiment of the present invention.

FIG. 1 is an overall schematic view of the direct injection internal combustion engine according to the one embodiment of the present invention.

The direct injection internal combustion engine according to this embodiment includes a fuel injection valve 2 disposed on one side of a combustion chamber 1, and an ignition plug 3 disposed centrally on an upper surface of the combustion chamber 1. The fuel injection valve 2 is able to inject fuel to the combustion chamber 1 at free timing regardless of the operation of an intake valve 4.

In stratified charge combustion that is a feature of the direct injection internal combustion engine, an electronic control throttle 6 disposed midway an intake pipe 5 is opened at a larger opening degree than in homogeneous charge combustion so that the amount of intake air is increased to ensure a higher air-fuel ratio.

An ECU 100 receives various signals such as a crank angle sensor signal Sca, an accelerator opening sensor signal Sap, and an intake air amount signal Sia from an air flow sensor 7 for measuring the amount of intake air. The ECU 100 controls the engine depending on operating conditions based on the received signals.

Valve timing varying mechanisms 9A, 9B vary the timing of opening and closing the intake valve 4 and an exhaust valve 8, respectively, for increasing the amount of exhaust gas and the torque. The valve timing varying mechanisms 9A, 9B are controlled in accordance with commands from the ECU 100. An external EGR passage 11 serves as a passage for returning a part of the exhaust gas through it from an exhaust pipe 10 to the intake pipe 5. An external EGR control valve 12 is a control valve for controlling the amount of exhaust gas to be returned to the external EGR passage 11. The external EGR control valve 12 is used to reduce the amount of NOx in a hot state of the engine, and is controlled in accordance with a command from the ECU 100.

Next, control procedures of a control system for an direct injection internal combustion engine according to this embodiment will be described with reference to FIG. 2.

Figure 2:
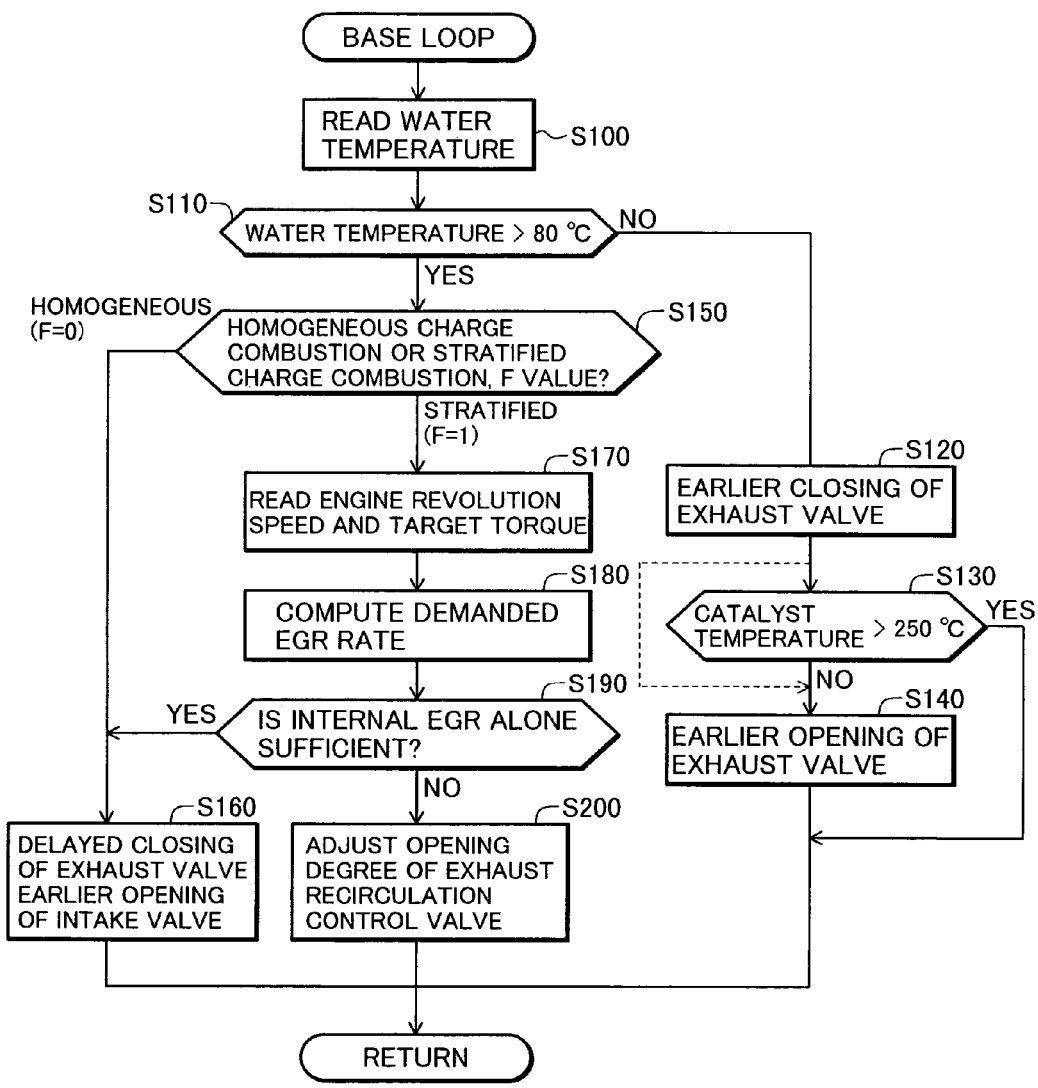
FIG. 2 is a flowchart showing control procedures of a control system for an direct injection internal combustion engine according to the one embodiment of the present invention.

FIG. 2 is a flowchart showing control procedures of the control system for the direct injection internal combustion engine according to the one embodiment of the present invention.

In step s100, the ECU 100 reads an engine cooling water temperature based on an output from a water temperature sensor mounted on the engine.

Then, in step silo, the ECU 100 determines whether the engine cooling water temperature reaches a predetermined value, e.g., 80° C. If the engine cooling water temperature is not higher than 80° C., the ECU 100 proceeds to step s120. If the engine cooling water temperature is higher than 80° C., the ECU 100 proceeds to step s150.

If the engine cooling water temperature is not higher than 80° C., the ECU 100 controls the valve timing varying mechanism 9B in step s120 to execute earlier closing control of the exhaust valve 8.

Procedures of the earlier closing control of the exhaust valve executed by the control system for the direct injection internal combustion engine according to this embodiment will now be described with reference to FIG. 3.

Figure 3:
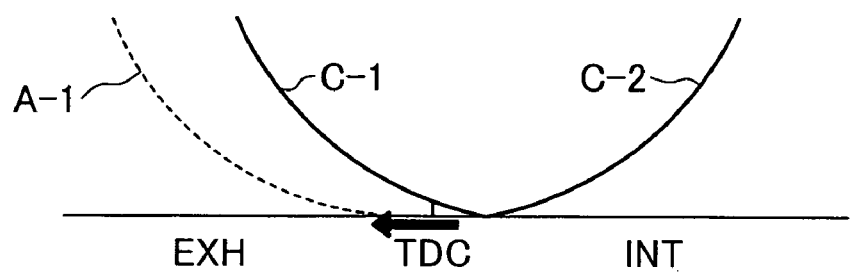
FIG. 3 is an explanatory view for explaining earlier closing control of an exhaust valve executed by the control system for the direct injection internal combustion engine according to the one embodiment of the present invention.

FIG. 3 is an explanatory view for explaining the earlier closing control of the exhaust valve executed by the control system for the direct injection internal combustion engine according to the one embodiment of the present invention. FIG. 3 shows, in an enlarged scale, cam profiles of the intake and exhaust valves near the intake top dead center in the earlier closing control of the exhaust valve.

Solid lines C-1, C-2 in FIG. 3 represent the timings of opening and closing the intake valve 4 and the exhaust valve 8 in the usual case, respectively. As represented by the solid line C-1, the timing of closing the exhaust valve is usually set near the intake top dead center (TDC). Also, as represented by the solid line C-2, the timing of opening the intake valve is usually set near the intake top dead center (TDC).

On the other hand, in the earlier closing control of the exhaust valve, as represented by a dotted line A-1 in FIG. 3, the ECU 100 controls the valve timing varying mechanism 9B to close the exhaust valve 8 at timing earlier than the usual closing timing of the exhaust valve so that the exhaust valve is closed while a piston is still rising. As a result, the exhaust gas, which is to be usually discharged to the exhaust pipe until the piston reaches the top dead center, is enclosed in the combustion chamber, whereby the internal EGR can be realized. The realization of the internal EGR makes it possible to reduce the amounts of NOx and HC in the exhaust gas when the water temperature is in a low state, e.g., at the startup. A method of realizing the internal EGR is not limited to a particular one and may be performed, instead of the earlier closing control of the exhaust valve, by using any other suitable means for returning internal EGR gas with variable control of the intake valve and the exhaust valve.

Then, in step s130, the ECU 100 determines whether the catalyst temperature is higher than, for example, 250° C. If the catalyst temperature is not higher than 250° C., the ECU 100 proceeds to step s140. If the catalyst temperature is higher than 250° C., the ECU 100 skips step s140. The temperature (250° C.) used here as a determination basis is set to determine whether a catalyst is activated. In other words, the temperature as the determination basis is not always required to be 250° C., and whether the catalyst is activated may be determined using any other suitable temperature.

If the catalyst temperature is not higher than, for example, 250° C., the ECU 100 controls the valve timing varying mechanism 9B in step s140 to execute earlier opening control of the exhaust valve 8.

Procedures of the earlier opening control of the exhaust valve executed by the control system for the direct injection internal combustion engine according to this embodiment will now be described with reference to FIG. 4.

Figure 4:
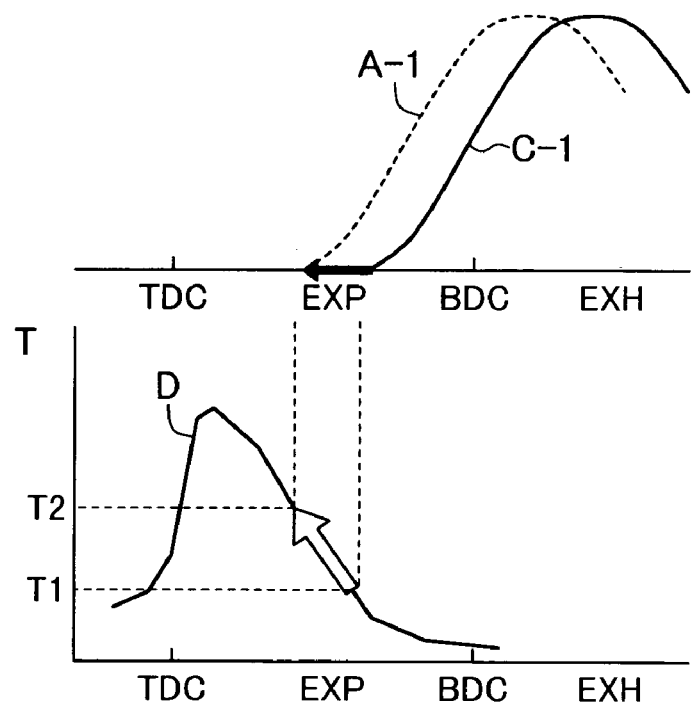
FIG. 4 is an explanatory view for explaining earlier opening control of the exhaust valve executed by the control system for the direct injection internal combustion engine according to the one embodiment of the present invention.

FIG. 4 is an explanatory view for explaining the earlier opening control of the exhaust valve executed by the control system for the direct injection internal combustion engine according to the one embodiment of the present invention. FIG. 4 shows, in an enlarged scale, cam profiles of the exhaust valve in the earlier opening control of the exhaust valve and an in-cylinder temperature (T).

A solid line C-1 in FIG. 4 represents the timing of opening the exhaust valve 8 in the usual case. On the other hand, a dotted line A-1 represents the timing of opening the exhaust valve 8 under the earlier opening control of the exhaust valve according to this embodiment. A solid line D represents the in-cylinder temperature in the expansion stroke. By opening the exhaust valve at earlier timing, the in-cylinder temperature at the opening timing of the exhaust valve is increased to T2 in the earlier opening control of the exhaust valve as compared with T1 in the usual setting control represented by the solid line C-1. Correspondingly, the exhaust gas at a higher temperature is discharged to the exhaust pipe. As a result, when the engine is in a cold state, particularly, during a period until the catalyst is activated, the higher-temperature exhaust gas can be supplied to the catalyst and the time required for the catalyst to be activated can be cut down. Such earlier opening control may be carried out only during a period from the startup to the time at which the catalyst temperature reaches the predetermined temperature.

However, because the above case accompanies a risk that the torque is lowered upon discharge of the higher-temperature exhaust gas, it is desired to increase the amount of injected fuel in advance corresponding to the lowering of the torque.

The increased amount of injected fuel provides not only the effect of reducing the amounts of HC and NOx exhausted from the combustion chamber, but also the effect of activating the catalyst at earlier timing without lowering the torque.

To detect the catalyst temperature, a catalyst temperature sensor must additionally be installed. As a solution for avoiding an increase of cost resulting from installing the catalyst temperature sensor, the ECU 100 may execute step s140 at once subsequent to step s120 without making the determination in step s130. When the water temperature is determined to be not higher than 80° C. in step s110, the catalyst temperature is also at a low level in many cases, such as experienced at the time of startup. For that reason, step s130 may be dispensed with.

In the case of the direct injection internal combustion engine using intake and exhaust valves of phase difference type, the earlier opening of the exhaust valve in step s140 is also required to be executed in order to perform the earlier closing of the exhaust valve for the purpose of executing step s120. Thus, both steps s140 and s120 are executed at the same time.

If it is determined in step 110 of FIG. 2 that the engine cooling water temperature is higher than 80° C., the ECU 100 determines in step s150 in accordance with a value of a flag F whether the current combustion state is homogeneous charge combustion or stratified charge combustion. If the homogeneous charge combustion is indicated by F=0, for example, the ECU 100 proceeds to step s160. If the stratified charge combustion is indicated by F=1, the ECU 100 proceeds to step s170. In this respect, the ECU 100 determines in advance based on the engine revolution speed and the demanded torque whether the homogeneous charge combustion or the stratified charge combustion is to be performed, and controls the amount of injected fuel and the timing of the fuel injection in accordance with the determination result. Thus, the ECU 100 holds therein the determination result as to whether the homogeneous charge combustion or the stratified charge combustion is to be performed, in the form of the flag F such that F=0 represents the homogeneous charge combustion and F=1 represents the stratified charge combustion. Accordingly, the current combustion state can be determined by referring to the flag F.

If the current state is the homogeneous charge combustion, the ECU 100 controls the valve timing varying mechanisms 9A, 9B in step s160 to execute earlier opening control of the intake valve 4 and delayed closing control of the exhaust valve 8.

Procedures of the earlier opening control of the intake valve and the delayed closing control of the exhaust valve executed by the control system for the direct injection internal combustion engine according to this embodiment will now be described with reference to FIG. 5.

Figure 5:
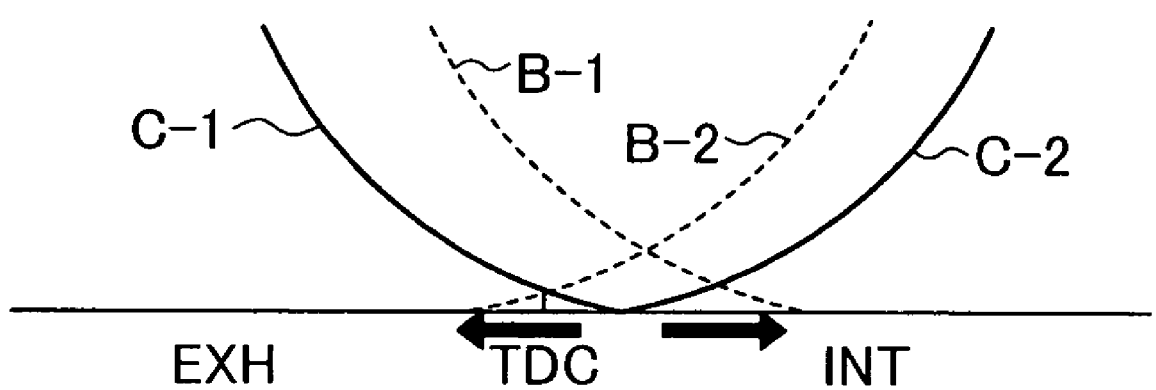
FIG. 5 is an explanatory view for explaining earlier opening control of an intake valve and delayed closing control of the exhaust valve executed by the control system for the direct injection internal combustion engine according to the one embodiment of the present invention.

FIG. 5 is an explanatory view for explaining the earlier opening control of the intake valve and the delayed closing control of the exhaust valve executed by the control system for the direct injection internal combustion engine according to the one embodiment of the present invention. FIG. 5 shows, in an enlarged scale, cam profiles of the intake and exhaust valves near the intake top dead center in the earlier opening control of the intake valve and the delayed closing control of the exhaust valve.

Solid lines C-1, C-2 in FIG. 5 represent, similarly to those in FIG. 3, the timings of opening and closing the intake valve 4 and the exhaust valve 8 in the usual case, respectively. As represented by the solid line C-1, the timing of closing the exhaust valve is usually set near the intake top dead center (TDC). Also, as represented by the solid line C-2, the timing of opening the intake valve is usually set near the intake top dead center (TDC).

Also, in the delayed closing control of the exhaust valve and the earlier opening control of the intake valve, as represented by a dotted line B-1, the ECU 100 controls the valve timing varying mechanism 9B to close the exhaust valve 8 at timing delayed from the usual closing timing of the exhaust valve. Further, as represented by a dotted line B-2, the ECU 100 makes control to open the intake valve 4 at timing earlier than the usual opening timing of the intake valve. This increases an amount of overlap between the opening period of the intake valve and the opening period of the exhaust valve. Stated another way, with the earlier opening B-2 of the intake valve, a part of the exhaust gas is jetted back into the intake pipe and is injected again to the combustion chamber after the piston reaches the top dead center. At the same time, with the delayed closing B-1 of the exhaust valve, the exhaust gas which has once been discharged to the exhaust pipe is sucked back again to the combustion chamber, whereby the internal EGR can be realized.

Then, in step s170, the ECU 100 reads the engine revolution speed and the target torque based on a pulse interval of the crank angle sensor signal Sca obtained from a crank angle sensor.

Then, in step s180, the ECU 100 computes a demanded EGR rate through mapping search, for example, from the engine revolution speed and the target torque both obtained in step s170.

Then, in step s190, the ECU 100 decides an internal EGR rate (i.e., change amounts of the intake and exhaust valves) from the engine revolution speed and the target torque, at which neither a deterioration of combustion nor a lowering of the torque occur, and it determines whether the internal EGR rate satisfies the demanded EGR rate computed in step s180. If the internal EGR rate satisfies the demanded EGR rate, the ECU 100 proceeds to step s160 in which it executes the easier opening control of the intake valve and the delayed closing control of the exhaust valve. If the internal EGR rate does not satisfy the demanded EGR rate, the ECU 100 proceeds to step s200.

In step s200, the ECU 100 controls the external EGR control valve 12 so as to return external EGR gas in amount enough to compensate for a shortage of the internal EGR rate in comparison with the demanded EGR rate.

During the engine operation, a sequence of processes from step s100 to step s200 are repeated to always return the EGR gas in amount optimum for the operation state to the combustion chamber. As a result, the amounts of HC and NOx exhausted from the combustion chamber during a period from the start of the engine operation to the stop of the engine operation can be reduced.

Thus, in this embodiment, as understood from the control procedures of step s160 and step s200 executed in accordance with the determination result in step s190, when the internal EGR is sufficient to satisfy the demanded EGR rate, only the internal EGR is performed, and when the internal EGR is not sufficient to satisfy it, the internal EGR and the external EGR are both performed in a combined manner.

With reference to FIGS. 6 to 10, a description is now be made of the combined utilization state of the internal EGR and the external EGR and of the effect of reducing the exhaust gas under control executed by the control system for the direct injection internal combustion engine according to this embodiment.

Figure 7:
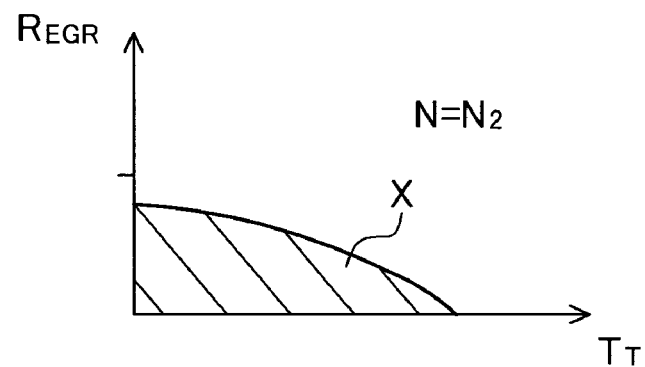
FIG. 7 is a graph for explaining a state of combined utilization of internal EGR and external EGR under control executed by the control system for the direct injection internal combustion engine according to the one embodiment of the present invention, when the engine revolution speed N is at N2.
Figure 8:
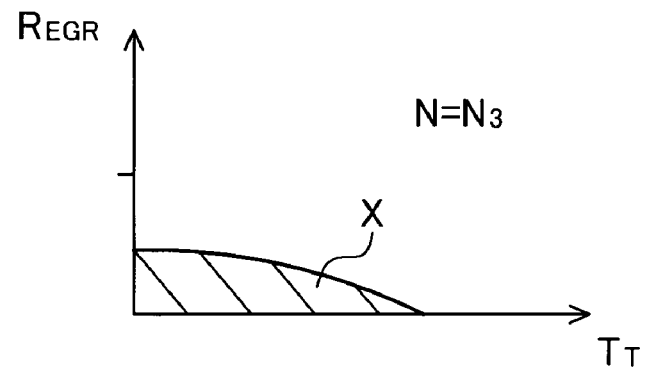
FIG. 8 is a graph for explaining a state of combined utilization of internal EGR and external EGR under control executed by the control system for the direct injection internal combustion engine according to the one embodiment of the present invention, when the engine revolution speed N is at N3.

First, the state of combined utilization of the internal EGR and the external EGR under control executed by the control system for the direct injection internal combustion engine according to this embodiment will be described with reference to FIGS. 6 to 8.

Figure 6:
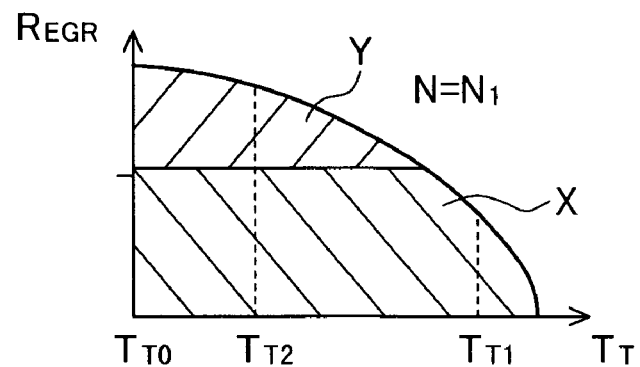
FIG. 6 is a graph for explaining a state of combined utilization of internal EGR and external EGR under control executed by the control system for the direct injection internal combustion engine according to the one embodiment of the present invention, when an engine revolution speed N is at N1.

FIG. 6 is a graph for explaining the state of combined utilization of the internal EGR and the external EGR under control executed by the control system for the direct injection internal combustion engine according to the one embodiment of the present invention, when an engine revolution speed N is at N1. FIG. 7 is a graph for explaining the state of combined utilization of the internal EGR and external EGR under control executed by the control system for the direct injection internal combustion engine according to the one embodiment of the present invention, when the engine revolution speed N is at N2. FIG. 8 is a graph for explaining the state of combined utilization of internal EGR and external EGR under control executed by the control system for the direct injection internal combustion engine according to the one embodiment of the present invention, when the engine revolution speed N is at N3. In each of those graphs, the horizontal axis represents a target torque $T_r$ and the vertical axis represents an EGR rate. Regarding the engine revolution speed N, there is a relationship of N1>N2>N3. A region X represents a region in which the internal EGR is performed, and a region Y represents a region in which the external EGR is performed.

The ECU 100 reads the engine revolution speed and the target torque in step s170 of FIG. 2, and computes the demanded EGR rate in step s180. When the engine revolution speed N reaches a relatively high value N1, the demanded EGR rate is also increased. As shown in FIG. 6, therefore, in a region where the target torque $T_T$ is relatively small, e.g., $T_{T2}$, the demanded EGR rate is increased to such an extent that the internal EGR alone is not sufficient. Hence, the external EGR is also performed in a combined manner. In a region where the target torque $T_T$ is relatively large, e.g., $T_{T1}$, however, the demanded EGR rate is decreased to such an extent that the internal EGR alone is sufficient. Hence, only the internal EGR is performed in such a region.

On the other hand, when the engine revolution speed N relatively lowers to N2 and then to N3, the demanded EGR rate is also decreased. As shown in FIGS. 7 and 8, therefore, the internal EGR alone is sufficient and henc only the internal EGR is performed.

Next, an exhaust gas reducing effect under control executed by the control system for the direct injection internal combustion engine according to this embodiment will be described with reference to FIGS. 9 and 10.

Figure 9:
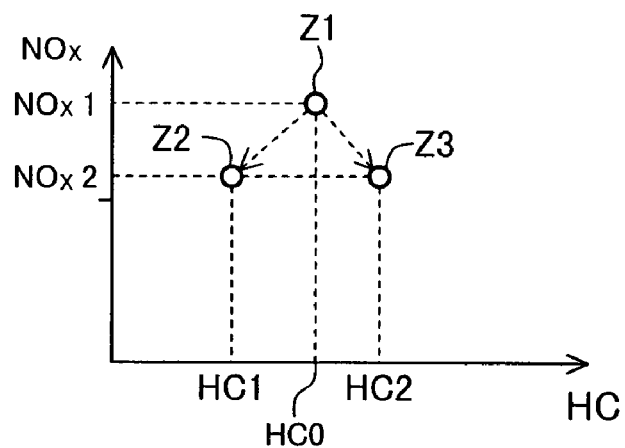
FIG. 9 is a graph for explaining an exhaust gas reducing effect, which is resulted in a region where a target torque is large, under control executed by the control system for the direct injection internal combustion engine according to the one embodiment of the present invention.
Figure 10:
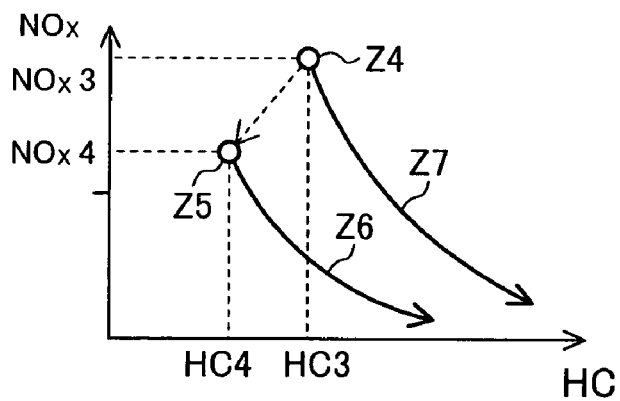
FIG. 10 is a graph for explaining an exhaust gas reducing effect, which is resulted in a region where the target torque is small, under control executed by the control system for the direct injection internal combustion engine according to the one embodiment of the present invention.

FIG. 9 is a graph for explaining the exhaust gas reducing effect, which is resulted in a region where the target torque is large, under control executed by the control system for the direct injection internal combustion engine according to the one embodiment of the present invention. FIG. 10 is a graph for explaining the exhaust gas reducing effect, which is resulted in a region where the target torque is small, under control executed by the control system for the direct injection internal combustion engine according to the one embodiment of the present invention. In each of those graphs, the horizontal axis represents the amount of HC exhausted and the vertical axis represents the amount of NOx exhausted.

In the case shown in FIG. 6, for example, when the target torque $T_T$ is $T_{T1}$, only the internal EGR is performed according to this embodiment. In an example shown in FIG. 9, a point Z1 represents the amount of exhaust gas exhausted when neither the internal EGR nor the external EGR are performed. At the point Z1, the amount of HC exhausted is HC1 and the amount of NOx exhausted is NOx1. By performing the internal EGR at the target torque $T_{T1}$ like this embodiment as shown in FIG. 6, the exhaust gas is reduced to a point Z2 by performing the internal EGR. More specifically, the amount of HC exhausted is reduced from HC1 to HC2 and the amount of NOx exhausted is reduced from NOx1 to NOx2.

In contrast, if the external EGR is performed at the target torque $T_{T1}$ as practiced in the past, the exhaust gas is changed to a point Z3. More specifically, the amount of HC exhausted is increased from HC1 to HC3 and the amount of NOx exhausted is reduced from NOx1 to NOx2.

Thus, by performing any type of EGR, the amount of NOx is reduced to a comparable extent if the EGR rate is the same. The amount of HC can be reduced by performing the internal EGR, but it is increased by performing the external EGR. In other words, with this embodiment, because the internal EGR is basically utilized, the amounts of both NOx and HC can be reduced. This point is similarly applied to the cases of lower engine revolution speeds, shown in FIGS. 7 and 8, in which only the internal EGR is performed.

Further, in the case shown in FIG. 6, when the target torque $T_T$ is $T_{T2}$, the internal EGR and the external EGR are performed in a combined manner according to this embodiment. In an example shown in FIG. 10, a point Z4 represents the amount of exhaust gas exhausted when neither the internal EGR nor the external EGR are performed. At the point Z4, the amount of HC exhausted is HC3 and the amount of NOx exhausted is NOx3. By performing the internal EGR and the external EGR at the target torque $T_{T2}$ in a combined manner like this embodiment as shown in FIG. 6, the amount of NOx in the exhaust gas is reduced to a point Z5 by the effect resulting from performing the internal EGR. More specifically, the amount of HC exhausted is reduced from HC3 to HC4 and the amount of NOx exhausted is reduced from NOx3 to NOx4. Then, as the target torque $T_T$ increases, the amounts of both NOx and HC are reduced as represented by a solid line Z6, and as compared with a solid line Z7.

In contrast, if only the external EGR is performed as practiced in the past, the exhaust gas is changed from the point Z4 as represented by a solid line Z7. More specifically, the amounts of both NOx and HC exhausted are reduced, but in particular the effect of reducing HC is lesser than that resulting from performing the internal EGR and the external EGR in a combined manner as represented by the solid line Z6. Thus, with this embodiment, the amounts of both NOx and HC can effectively comparatively be reduced by utilizing the internal EGR as basic control.

The construction of the direct injection internal combustion engine according to this embodiment will be described below with reference to FIG. 11.

Figure 11:
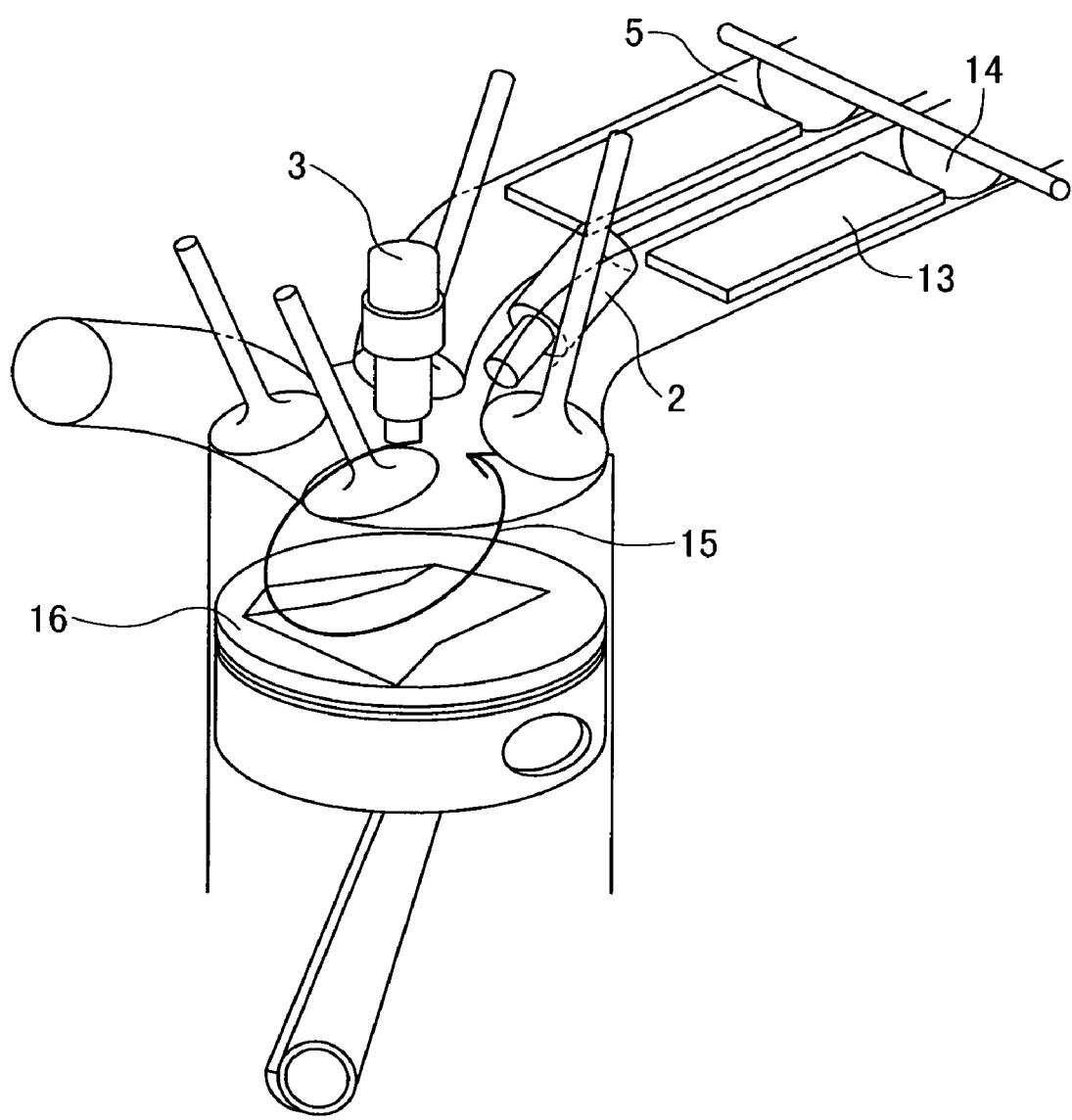
FIG. 11 is a perspective view of the direct injection internal combustion engine according to the one embodiment of the present invention.

FIG. 11 is a perspective view of the direct injection internal combustion engine according to the one embodiment of the present invention. It is to be noted that the construction of the direct injection internal combustion engine, shown in FIG. 11, is suitable for control executed by the control system according to this embodiment, but the present invention is not limited to the illustrated construction. The same characters as those in FIG. 1 denote the same components.

In the intake pipe 5, an air movement generating plate 13 is disposed so as to divide the interior of the intake pipe 5 into two upper and lower spaces. An air movement control valve 14 is disposed upstream of the air movement generating plate 13. Upon closing of the air movement control valve 14, air sucked during the intake stroke is caused to form a vertical air movement (tumble) 15 in the combustion chamber 1.

Further, a piston 16 has a groove formed in its crown surface for sustaining the tumble 15. In the stratified charge combustion, fuel injected from the fuel injection valve 2 in the latter half of the compression stroke is guided toward an ignition plug 3 with the aid of the tumble 15.

The construction of a fuel injection valve for use in the direct injection internal combustion engine according to this embodiment will be described below with reference to FIGS. 12 to 14.

Figure 12:
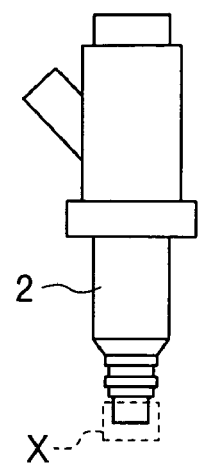
FIG. 12 is an overall side view of a fuel injection valve for use in the direct injection internal combustion engine according to the one embodiment of the present invention.

FIG. 12 is an overall side view of the fuel injection valve for use in the direct injection internal combustion engine according to the one embodiment of the present invention. FIG. 13 is an enlarged sectional view of a principal part of the fuel injection valve for use in the direct injection internal combustion engine according to the one embodiment of the present invention. FIG. 14 is a bottom view of a principal part of the fuel injection valve for use in the direct injection internal combustion engine according to the one embodiment of the present invention. It is to be noted that the construction of the fuel injection valve, shown in the drawings, is suitable for use in the internal combustion engine controlled by the control system according to this embodiment, but the present invention is not limited to the illustrated construction.

FIG. 12 shows the construction, as viewed from side, of the fuel injection valve 2 according to this embodiment. FIG. 13 shows, in an enlarged scale, a region X, surrounded by broken lines, of a distal end portion of the fuel injection valve 2.

Figure 13:
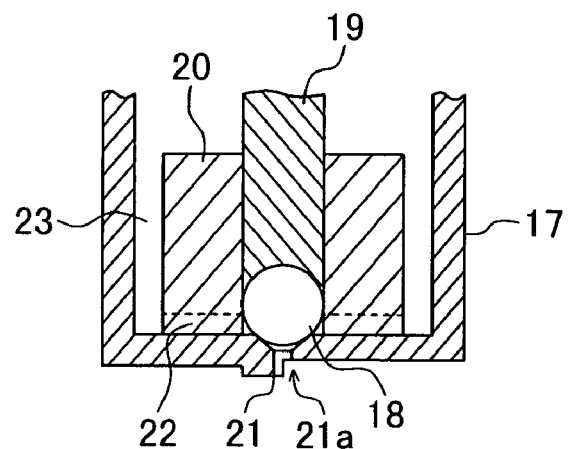
FIG. 13 is an enlarged sectional view of a principal part of the fuel injection valve for use in the direct injection internal combustion engine according to the one embodiment of the present invention.

As shown in FIG. 13, a nozzle portion 17 of the fuel injection valve 2 includes a ball valve 18, a rod 19 connected to the ball valve 18, a swirler 20 for giving a swirling force to a spray, an injection port 21, an axial groove 23, and a radial groove 22. In this embodiment, the injection port 21 formed at a fore end of the nozzle portion 17 is not symmetric in the left-and-right direction, and a cutout 21a is formed at a part of the injection port 21. In the illustrated example, the cutout 21a is formed over an angular range of 180 degrees.

When the ball valve 18 is opened, fuel flows through the axial groove 22 and the radial groove 23 and is then injected through the injection port 21 while a swirling force is applied to the fuel. Because the cutout 21a is formed in the injection port 21, a lead spray and an ignition spray are formed as described later with reference to FIGS. 15 and 16.

Figure 14:
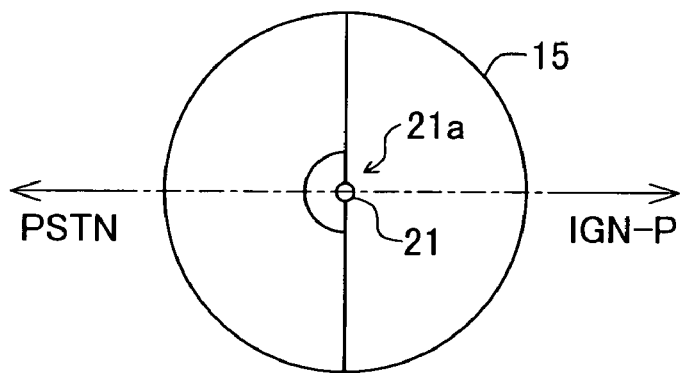
FIG. 14 is a bottom view of a principal part of the fuel injection valve for use in the direct injection internal combustion engine according to the one embodiment of the present invention.

In an example shown in FIG. 14, a direction of arrow IGN-P represents the ignition plug side, and a direction of arrow PSTN represents the piston side. Stated another way, the lead spray is injected in a direction toward the ignition plug by arranging the fuel injection valve 2 such that the cutout 21a of the injection port 21 is oriented toward the ignition plug side.

Figure 15:
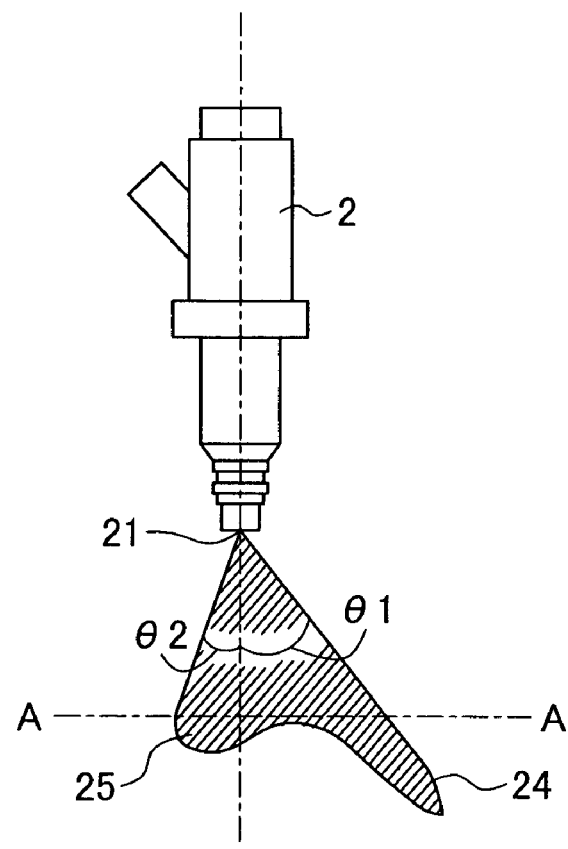
FIG. 15 is a side view showing the shape of a fuel spray injected from the fuel injection valve for use in the direct injection internal combustion engine according to the one embodiment of the present invention.
Figure 16:
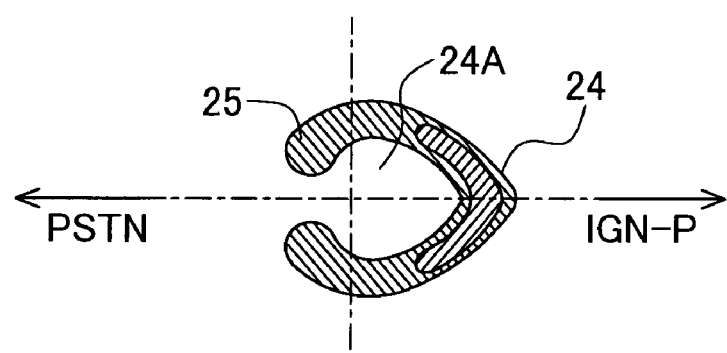
FIG. 16 is a sectional view taken along line A—A in FIG. 15.

With reference to FIGS. 15 and 16, a description is now made of the shape of a fuel spray injected from the fuel injection valve for use in the direct injection spark ignition engine according to this embodiment.

FIG. 15 is a side view showing the shape of a fuel spray injected from the fuel injection valve for use in the direct injection internal combustion engine according to the one embodiment of the present invention. FIG. 16 is a sectional view taken along line A—A in FIG. 15.

As shown in FIG. 15, the shape of the fuel spray sprayed through the injection port 21 of the fuel injection valve 2 is not symmetrical in the left-and-right direction because the cutout is formed in the injection port. A spray angle θ1 of a lead spray 24 relative to the centerline of the fuel injection valve 2 is, for example, 30 degrees. Also, a spray angle θ2 of an ignition spray 25 relative to the centerline of the fuel injection valve 2 is, for example, 20 degrees.

Further, as shown in FIG. 16, with the cutout formed in the injection port 21, the fuel spray has a sectional shape in which a void 24A is formed in a part of the spray. In addition, the lead spray 24 injected toward the ignition plug 3 has a higher flow density than the ignition spray 25. Therefore, the lead spray 24 reaches over a longer distance than the ignition spray 25.

The spray angle θ1 of the lead spray 24 and the spray angle θ2 of the ignition spray 25 are variously changeable depending on the shape of the cutout formed in the injection port 21. Additionally, the structure of the fuel injection valve is not limited to the above-described one, and a fuel injection valve having means for injecting a lead fluid in any other suitable form, e.g., multiple holes, can also be used.

With the arrangement described above, since the spray penetrating force in the direction toward the ignition plug is increased, the fuel spray can be carried up to the ignition plug even at a high revolution speed and the operation under the stratified charge combustion is enabled. It is hence possible to promote evaporation of the fuel spray in the initial spray stage and reduce the HC exhaust rate while suppressing mixing of combustion gas with fresh air and maintaining combustion stability, and further to reduce the amount of NOx with the effect of the exhaust gas recirculation.

Figure 17:
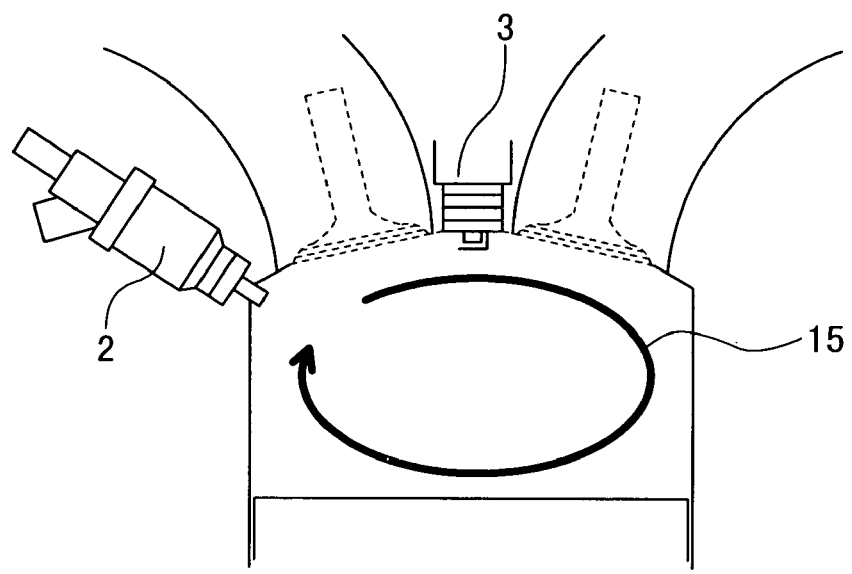
FIG. 17 is an explanatory view for explaining a spray behavior in a cylinder before fuel injection when stratified charge combustion takes place in the direct injection internal combustion engine according to the one embodiment of the present invention.
Figure 18:
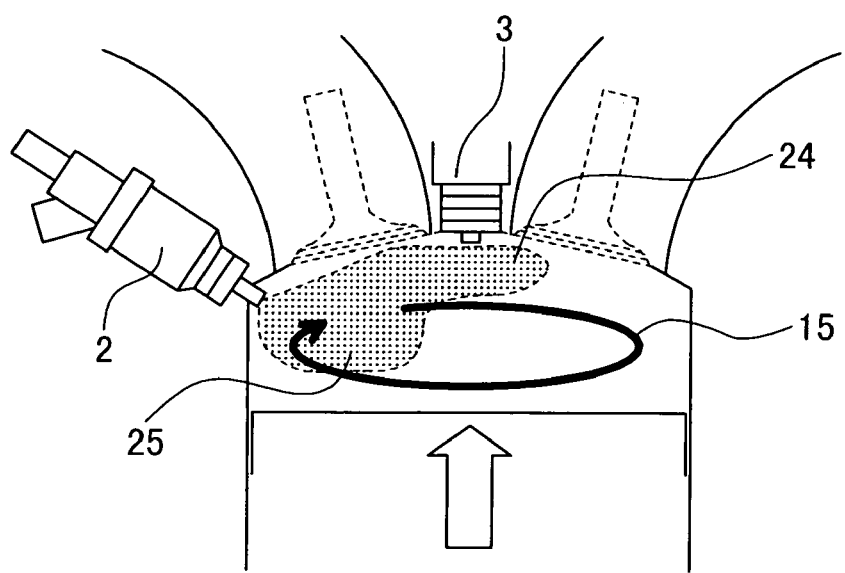
FIG. 18 is an explanatory view for explaining a spray behavior in the cylinder after fuel injection when stratified charge combustion takes place in the direct injection internal combustion engine according to the one embodiment of the present invention.

With reference to FIGS. 17 and 18, a description is now made of spray behaviors during the stratified charge combustion in the direct injection internal combustion engine according to this embodiment.

FIG. 17 is an explanatory view for explaining a spray behavior in a cylinder before fuel injection when stratified charge combustion takes place in the direct injection internal combustion engine according to the one embodiment of the present invention. FIG. 18 is an explanatory view for explaining a spray behavior in the cylinder after fuel injection when stratified charge combustion takes place in the direct injection internal combustion engine according to the one embodiment of the present invention.

In the case of stratified charge combustion, as shown in FIG. 17, the tumble 15 is formed in the cylinder before the fuel injection at a level of intensity depending on the engine revolution speed and the target torque by control of the opening degree of the air movement generating valve.

After the fuel injection, as shown in FIG. 18, by employing, e.g., the fuel injection valve 2 having the particular structure and being able to produce the fuel spray in the particular shape as described above with reference to FIGS. 12 to 16, a fluid flow guided toward the ignition plug 3 can be produced prior to the succeeding ignition spray 25 with the movement of the lead spray 24 separately from the tumble 15. Accordingly, an air-fuel mixture evaporated from the ignition spray 25 can more positively be guided to the ignition plug 3 at the ignition timing while the air-fuel mixture is led by the fluid produced with the lead spray 24.

A method of controlling fuel injection by the control system for the direct injection internal combustion engine according to this embodiment will be described below with reference to FIGS. 19 to 22.

With reference to FIG. 19, a description is first made of control procedures of the fuel injection control method executed by the control system for the direct injection internal combustion engine according to this embodiment. It is to be noted that this method is carried out during a period until a catalyst is activated.

FIG. 19 is a flowchart showing the control procedures of the fuel injection control method executed by the control system for the direct injection internal combustion engine according to the one embodiment of the present invention.

In step s200, the ECU 100 reads a catalyst temperature from the catalyst temperature sensor mounted on the engine.

Then, in step s210, the ECU 100 determines whether the catalyst temperature reaches a predetermined value, for example, 250° C. If the catalyst temperature is not lower than 250° C., a control process prior to activation of the catalyst is brought to an end and ordinary fuel injection control is executed. The ordinary fuel injection control means control in which fuel is injected at one time during the compression stroke. On the other hand, in the control process prior to activation of the catalyst, fuel is injected at two times during the compression stroke.

Figure 20A:
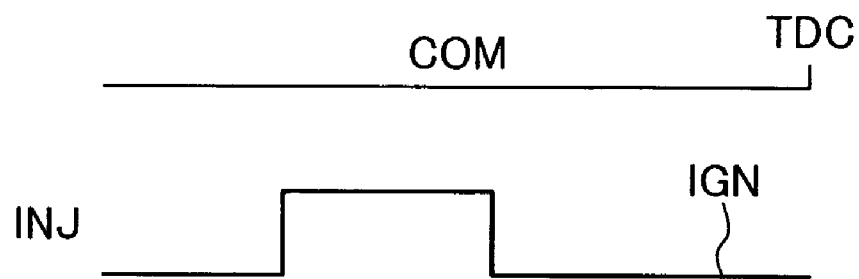
FIG. 20 is an explanatory view for explaining the control procedures of the fuel injection control method executed by the control system for the direct injection internal combustion engine according to the one embodiment of the present invention.
Figure 20B:
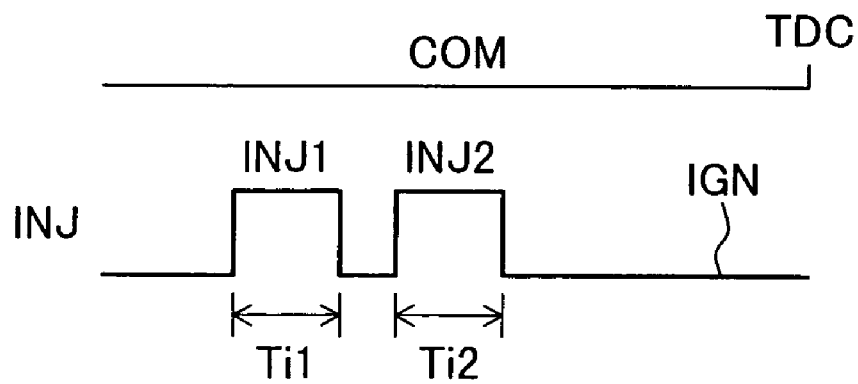
Figure 21:
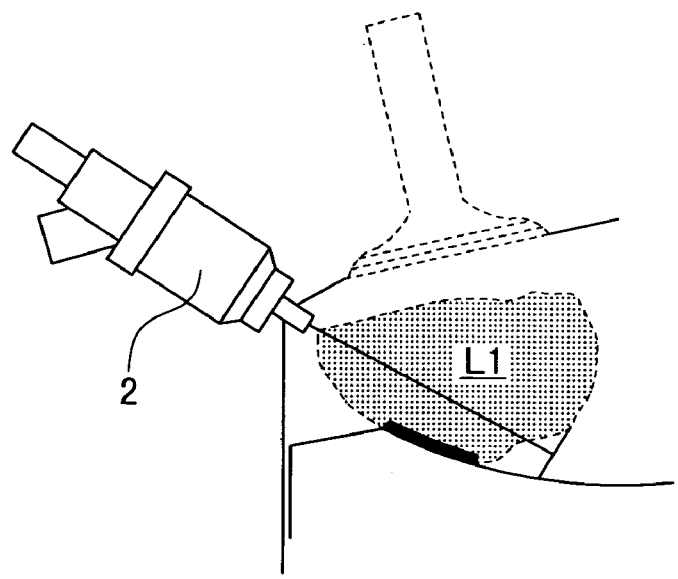
FIG. 21 is an explanatory view for explaining the state of a fuel spray under the fuel injection control after activation of a catalyst executed by the control system for the direct injection internal combustion engine according to the one embodiment of the present invention.
Figure 22:
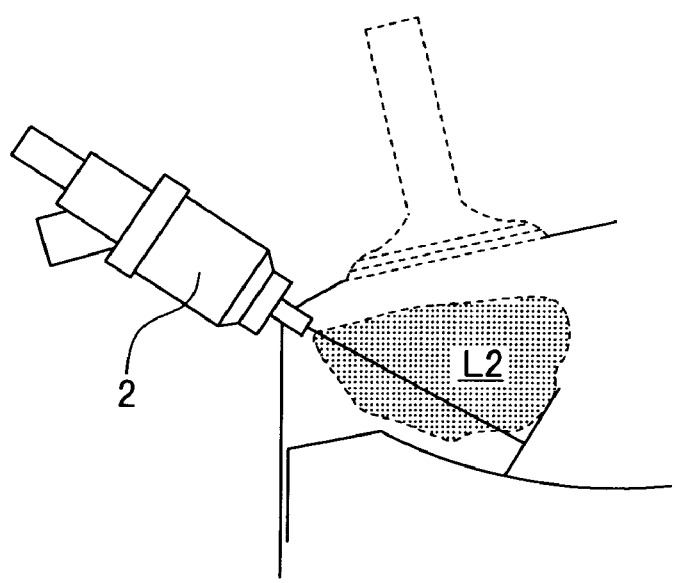
FIG. 22 is an explanatory view for explaining the state of a fuel spray under the fuel injection control before activation of the catalyst executed by the control system for the direct injection internal combustion engine according to the one embodiment of the present invention.

With reference to FIG. 20 to 22, a description is now made of the control procedures of the fuel injection control method executed by the control system for the direct injection internal combustion engine according to this embodiment.

FIG. 20 is an explanatory view for explaining the control procedures of the fuel injection control method executed by the control system for the direct injection internal combustion engine according to the one embodiment of the present invention. FIG. 21 is an explanatory view for explaining the state of a fuel spray under the fuel injection control after the activation of the catalyst executed by the control system for the direct injection internal combustion engine according to the one embodiment of the present invention. FIG. 22 is an explanatory view for explaining the state of a fuel spray under the fuel injection control before the activation of the catalyst executed by the control system for the direct injection internal combustion engine according to the one embodiment of the present invention.

As shown in FIG. 20(A), after the activation of the catalyst, fuel is injected at one time during the compression stroke (COM). On the other hand, before the activation of the catalyst, fuel is injected at two times, i.e., fuel injections INJ1 and INJ2, during the compression stroke (COM) as shown in FIG. 20(B). In a period until the catalyst is activated, since the exhaust cleaning effect of the catalyst is not sufficient, a larger amount of HC exhausted from the combustion chamber is discharged to the atmosphere. For that reason, in the period until the catalyst is activated, the combustion is required not to exhaust HC from the combustion chamber. Particularly, fuel attached to wall surfaces of the combustion chamber in a cold state of the engine, such as before the activation of the catalyst, is hard to evaporate because of the wall surfaces of the combustion chamber being cold, and hence is exhausted as HC not yet burnt.

In the period before the activation of the catalyst, therefore, fuel is injected at two times with a fuel injection penetration distance L2 as shown in FIG. 17, which is shorter than a fuel injection penetration distance L1 obtained when fuel is injected at one time as shown in FIG. 21. Attachment of fuel to the piston is thereby suppressed. Thus, the amount of not-yet-burnt HC exhausted from the combustion chamber can greatly be reduced in combination with the effect of promoting evaporation of the fuel spray resulting from the internal EGR.

To explain such control in more detail, if the catalyst temperature is lower than 250° C., the ECU 100 proceeds to step s220 in FIG. 19.

Then, in step s220, the ECU 100 reads the target torque and the target equivalent ratio.

Then, in step s230, the ECU 100 computes, based on the target torque and the target equivalent ratio both obtained in step s220, a first fuel injection pulse width Ti1 and a second fuel injection pulse width Ti2 corresponding to the required fuel amount by, for example, mapping search.

Then, in step s240, the ECU 100 reads the engine revolution speed obtained from the interval of pulses outputted from the crank angle sensor.

Then, in step s250, the ECU 100 computes, based on the engine revolution speed obtained in step s240, a first fuel injection timing IT1 and a second fuel injection timing IT2.

The above control process from step s220 to s250 is repeatedly executed until the catalyst temperature reaches 250° C.

With this embodiment, as described above, the amounts of both HC and NOx exhausted from the combustion chamber during a period from the start of the engine operation to the stop of the engine operation can effectively be reduced.

INDUSTRIAL APPLIABILITY

According to the present invention, it is possible to effectively reduce the amounts of both HC and NOx exhausted from the combustion chamber during a period from the start of the engine operation to the stop of the engine operation.

What is claimed is:

1. A control system for an direct injection internal combustion engine of spark ignition type comprising:

an external EGR passage for returning a part of exhaust gas from an exhaust pipe to an intake pipe, an external EGR control valve for controlling an amount of exhaust gas returned to said external EGR passage, and a valve timing varying mechanism for varying timing of opening and closing at least one of an intake valve and an exhaust valve, said control system including control means for controlling said valve timing varying mechanism to always return internal EGR gas in an operation region where exhaust gas recirculation is required, and for controlling said external EGR control valve to return exhaust gas in a combination of internal EGR and external EGR when an internal EGR rate provided by said valve timing varying mechanism is not sufficient to satisfy an EGR rate demanded depending on an operation state.

2. A control system for an direct injection internal combustion engine according to claim 1, wherein said control means returns only the internal EGR gas when an engine water temperature is not higher than a predetermined value.

3. A control system for an direct injection internal combustion engine according to claim 1, wherein said control means returns only the internal EGR gas when a catalyst temperature is not higher than a predetermined value.

4. A control system for an direct injection internal combustion engine according to claim 1, wherein said control means returns only the internal EGR gas when combustion is in the form of homogenous charge combustion.

5. A control system for an direct injection internal combustion engine according to claim 1, wherein said direct injection internal combustion engine includes lead fluid generating means for generating a fluid flow supplied in a direction toward an ignition plug prior to a succeeding ignition fuel separately from an air movement supplied to the combustion chamber, an air-fuel mixture evaporated from an ignition fuel spray is supplied to said ignition plug at the ignition timing while the air-fuel mixture is led by the fluid produced by said lead fluid generating means.

6. A control system for an direct injection internal combustion engine according to claim 1, wherein said control means injects fuel at two separate timings in a compression stroke during a period until activation of a catalyst at the startup.

* * * * *